(No Model.)

W. P. GOULD.
NON-CONDUCTIVE AND ORNAMENTAL HANDLE FOR VESSELS, &c.

No. 433,284. Patented July 29, 1890.

WITNESSES
Robert Wallace.
C. E. Holte.

INVENTOR
Wm P. Gould,
by Wm A. Macleod.
Atty.

UNITED STATES PATENT OFFICE.

WILLIAM P. GOULD, OF NEWTONVILLE, MASSACHUSETTS.

NON-CONDUCTIVE AND ORNAMENTAL HANDLE FOR VESSELS, &c.

SPECIFICATION forming part of Letters Patent No. 433,284, dated July 29, 1890.

Application filed October 24, 1889. Serial No. 327,991. (No model.)

*To all whom it may concern:*

Be it known that I, WILLIAM P. GOULD, of Newtonville, county of Middlesex, State of Massachusetts, have invented certain new and useful Improvements in Non-Conductive and Ornamental Handles for Vessels, Electrical Switches, Knives, and the Like, of which the following is a specification, reference being had to the drawings accompanying and forming a part hereof, in which—

Figure 1:
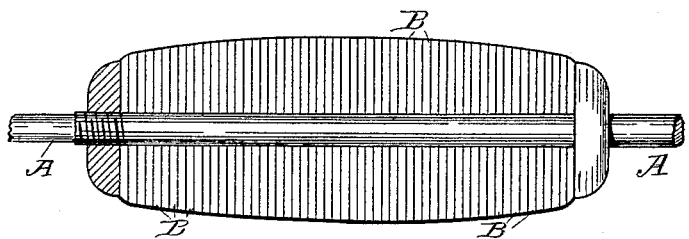
Figure 2:
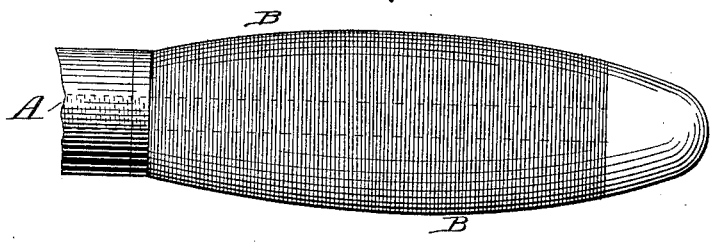
Figure 3:
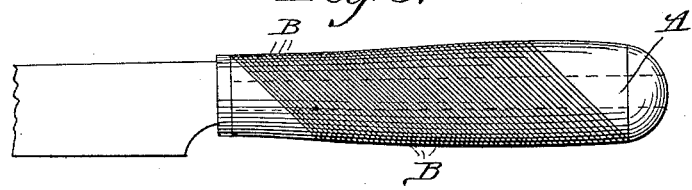

Figure 1 is a lengthwise section of a handle employing my improved non-conductor and showing the application of my improvement in the construction of handles for kettles or implements of various kinds which require to be handled while hot. Fig. 2 is a perspective view of an electric-switch handle. Fig. 3 is a modification.

The chief object of my invention is the construction of a durable, cheap, and effective non-conductor, which may be employed in the construction of handles for objects which require to be handled while hot, as also for electrical-switch handles and the like, which require to be non-conductors of electricity.

My invention also has for its object the construction of ornamental knife-handles, door-knobs, and the like, which shall be durable, and which shall not be liable to crack or break when subjected to sudden changes of temperature.

My invention is simple and will be readily understood from the following description, in which reference is made to the accompanying drawings.

A is a core or support of metal or other suitable material.

B are plates or layers of mica, which have had a hole cut through their centers of a size sufficient to accommodate the core or support A. The layers B, after having thus had holes punched in them, are strung on the support A in sufficient numbers to form the length of non-conductor desired, each layer being substantially at right angles to the core or support. The layers are then pressed tightly together by having a washer or plate strung on the support at either end and a nut screwed onto the support outside the washers or plates until the layers are forced solidly together. The precise means employed for forcing the layers together is not material. The support, with the mica strung on it, is then placed in a lathe and the mica turned down smoothly and formed into whatever shape desired, after which it may be polished and finished. In this manner a hard, smooth, durable, non-conductor having the very low degree of non-conductivity possessed by a mass of pure mica is produced. As such non-conducting handles are usually of comparatively small diameter, the pieces of mica used are very inexpensive, and such non-conductors can consequently be produced at low cost.

I do not desire to limit myself in the application of my invention to non-conductors or insulators, as it may be employed in the construction of a variety of useful and ornamental articles, such as knife-handles, door-knobs, and the like. It should also be understood that the layers of mica, although preferably placed at right angles to the support or core A, may be so shifted as to considerably vary the angle which they form with the support, as shown, Fig. 3, without departing essentially from my invention.

I am aware that valve-plugs have been constructed by clamping a block or a number of disks cut from sheet-mica on the end of a valve-stem. Such a construction is shown in Letters Patent No. 355,487 to R. W. Traylor, and I do not claim the same.

What I claim is—

A non-conductive handle composed of parallel layers of mica strung on a suitable support, substantially as shown and described.

WILLIAM P. GOULD.

Witnesses:
WM. A. MACLEOD,
GEORGE B. WATSON.